United States Patent [19]

Schrader

[11] 4,166,686
[45] Sep. 4, 1979

[54] SHUTTER-CONTROL MECHANISM FOR PHOTOGRAPHIC CAMERA

[75] Inventor: Goetz Schrader, Frankfurt am Main, Fed. Rep. of Germany

[73] Assignee: Plaubel, Feinmechanik & Optik GmbH, Frankfurt am Main, Fed. Rep. of Germany

[21] Appl. No.: 831,265

[22] Filed: Sep. 7, 1977

[30] Foreign Application Priority Data

Sep. 8, 1976 [DE] Fed. Rep. of Germany ... 7628114[U]

[51] Int. Cl.² ............................................. G03B 17/38
[52] U.S. Cl. ..................................... 354/266; 354/187; 354/204
[58] Field of Search .................. 354/187, 192–195, 354/204, 266, 268, 162, 163, 166–169, 208, 269

[56] References Cited

U.S. PATENT DOCUMENTS

| | | | |
|---|---|---|---|
| 3,398,666 | 8/1968 | Mamiya et al. | 354/195 |
| 3,922,693 | 11/1975 | Matsui | 354/266 X |

*Primary Examiner*—John Gonzales
*Attorney, Agent, or Firm*—Montague & Ross

[57] ABSTRACT

A disk rigid with a member of a gear train for the control of a spring-loaded setting ring of a shutter, connected via a lost-motion coupling with a wind-up lever, is rotatably mounted on a camera housing alongside a focusing knob which controls the displacement of a lens mount linked with the housing through a bellows. The knob has a tubular stem accommodating a pushbutton which, through a pair of outwardly projecting lugs, rests on a surrounding leaf spring having a tongue that engages in a notch of the disk in the cocked position of the shutter. Depression of the pushbutton disengages the tongue from its notch to release the shutter; such depression may be blocked by an underlying stop in a collapsed position of the camera.

7 Claims, 4 Drawing Figures

SHUTTER-CONTROL MECHANISM FOR PHOTOGRAPHIC CAMERA

FIELD OF THE INVENTION

My present invention relates to a photographic camera of the collapsible type whose housing, designed to accommodate a film to be exposed, is connected with a movable lens mount, carrying the exposure objective, through an extendible linkage allowing the distance of the objective from the film plane to be adjusted for focusing purposes by varying the separation of the lens mount from the housing. Usually, a bellows is inserted between the lens mount and the housing to form a light-tight enclosure between the objective and the film chamber.

BACKGROUND OF THE INVENTION

Generally, the lens mount of such a bellows camera also carries a shutter which is centered on the optical axis of the objective and can be cocked with the aid of a spring-loaded setting ring. To release the shutter from its cocked position, a trigger such as a pushbutton must be actuated. Conventionally, the trigger is disposed on the lens mount where it can be operatively coupled with the setting ring by a simple mechanical transmission.

In my copending application Ser. No. 831,279 of even date, whose disclosure is hereby incorporated by reference in the present application, I have described a shutter-control mechanism comprising actuating means on the camera housing operatively connected with a setting ring on the lens mount via a gear train supported on a part of the extendible linkage which connects the lens mount with the housing, specifically on a pair of legs of equal length forming a knee joint.

The shutter-actuating means disclosed in my above-identified application comprises two separate operating elements, namely a wind-up lever connected with the gear train by way of a lost-motion coupling and a release member or trigger juxtaposed therewith. While the emplacement of these elements on the housing rather than on the lens mount simplifies the operation of the shutter and allows for a steadier holding of the camera during picture-taking, space considerations may create a problem, e.g. when part of the upper housing surface is used to accommodate a withdrawable viewfinder according to the disclosure of my copending application Ser. No. 831,266 of even date.

In certain prior-art cameras, a shutter-release button or trigger is received in a knob controlling the film transport to save space. Since, however, the advance of the film and the tripping of the shutter occur at different times, usually with intervening focusing upon the object to be photographed, a physical juxtaposition of the shutter release with a focusing knob would be more convenient.

OBJECT OF THE INVENTION

The object of my present invention, therefore, is to provide an improved actuating mechanism for the shutter of a camera, especially one of the collapsible type discussed above, which satisfies the desiderata of compactness and convenience.

SUMMARY OF THE INVENTION

In accordance with this invention, a pushbutton serving to release a camera shutter from its cocked position by the deactivation of detent means engageable by wind-up means is received in a focusing knob on the camera housing which is operatively coupled with a lens or a set of lenses for axially moving same with reference to the plane of a film within the housing.

In my copending applications Ser. Nos. 831,267 and 831,272 of even date, whose disclosures are hereby likewise incorporated by reference in the present application, I have described and claimed a focusing mechanism including a pair of rack-and-pinion transmissions coacting with the respective scissor links on opposite sides of the optical axis by which the lens mount is articulated to the housing. In such a system, pursuant to another feature of my invention, the focusing knob has a hollow stem fastened to a shaft which traverses the housing and carries the two pinions at opposite extremities; the pushbutton, seated in the hollow stem, has a radial extension passing through a lateral slit in the stem to bear upon a retaining member such as a leaf spring which is traversed by the stem and forms part of the aforementioned detent means.

BRIEF DESCRIPTION OF THE DRAWING

The above and other features of my invention will now be described in detail with reference to the accompanying drawing in which.

SPECIFIC DESCRIPTION

Figure 3:
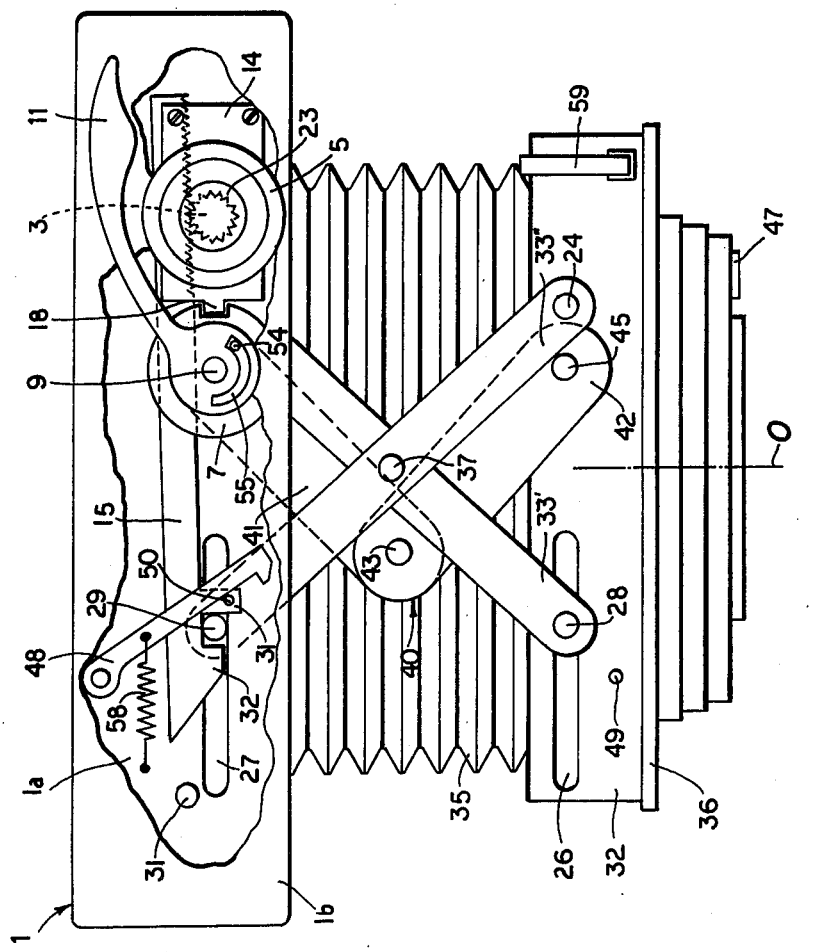
FIG. 3 is a top view of the camera, showing additional details.

Reference will first be made to FIG. 3 where I have shown a collapsible camera comprising a housing 1 and a lens mount 32 interconnected by a bellows 35 as well as by an articulated linkage which includes two pairs (only one shown) of scissor arms 33', 33" pivotally interconnected at 37. Another part of that linkage is a knee joint 40 formed from a pair of legs 41, 42 of equal length interconnected by a hinge pin 43, leg 41 being pivotable on housing 1 about a post 9 whereas leg 42 is pivotable on lens mount 32 about the axis of an output shaft 45. The legs of knee joint 40 serve as carriers for a gear train forming part of a mechanical transmission for the operation of a shutter associated with an objective 39 (FIG. 4) whose optical axis is shown at O and which is disposed on a lens board 36 also accommodating a window 47 for an electric eye of a photometer. The detailed construction of the knee joint 40 and of the associated gear train is described and illustrated in my copending application Ser. No. 831,279 referred to above.

Arms 33', 33" constitute a scissor link forming the upper section of the articulated linkage, inserted above axis O between housing 1 and lens mount 32, a nonillustrated replica of that scissor link being disposed on the bottom of the camera below bellows 35. Arm 33' has one end articulated to housing 1 by a pivot pin not shown and carries at its opposite end a pin 28 which is slidable in a guide slot 26 of lens mount 32. In an analogous manner, arm 33" has one end articulated to lens mount 32 by a pivot pin 24 and carries at its opposite end a pin 29 slidable in a guide slot 27 of housing 1.

A vertical shaft 2 (FIG. 2) traverses the housing 1, at a location laterally offset from optical axis O, and carries at its top a focusing knob 5 serving to control the scissor linkage 33', 33". Shaft 2 is provided at its top and bottom extremities with a pair of pinions 3 meshing with respective rack members 15 which are slidable along upper and lower walls 1a of housing 1. It is to be noted that these walls lie within an external envelope 1b which is partly shown in FIG. 3 and has not been illustrated otherwise. Only the upper one of the two identical rack-and-pinion transmissions 3, 15 is visible in the drawing.

An untoothed end of rack 15 remote from pinion 2 carries a pair of prongs 31 and 32 separated by a gap which fits closely about the pin 29 guided in slot 27 of wall 1a. A hairpin spring, not shown, bears upon the back of rack 15 at two locations, i.e. opposite its point of contact with pinion 3 and in the vicinity of prong 31. With lens mount 32 extended as shown in FIG. 3, the camera is in operating position and can be focused upon objects at distances ranging from infinity to closeup. Within that operating range, rack 15 lies parallel to slot 27 as well as to the major sides of housing 1 and is positively coupled with scissor arm 33" via pin 29. The movement of the rack is determined solely by its contact with its hairpin spring, pinion 3 and pin 29; thus, the rack is free to swing out laterally against the spring force upon reaching the limit of its stroke corresponding to focusing at infinity when a stud 31 on housing wall 1a strikes a camming edge forming the outer flank of prong 32 to deflect the rack from its linear path. Such deflection decouples the arm 33" from the rack 15 by removing the shorter prong 32 from registry with slot 27, the longer prong 31 continuing to span that slot so as to prevent the pin 29 from moving back into focusing position. Since, however, pin 29 can now travel freely in the opposite direction within slot 27, the camera can be completely collapsed with retraction of lens mount 32 into the housing 1. This retraction of the lens mount can be carried out rapidly by hand, possibly against the resiliency of bellows 35 and/or the force of a nonillustrated compression spring tending to re-extend the lens mount. A latch 48 may then hold the lens mount withdrawn by engaging a coacting pin 49 thereon; as long as the rack 15 occupies the operating position of FIG. 3, the latching mechanism is disabled by a pin 50 on prong 31 which blocks the clockwise swing of the latch under the control of a biasing spring 58 into its locking position. This feature is more fully described and claimed in my aforementioned copending application Ser. No. 831,272.

Knob 5, rotatable with shaft 2 over an arc of more than 180°, may be formed with a peripheral notch releasably engageable by an indexing spring at the instant when the camera is focused on infinity, i.e. just before the stud 31 begins to decouple the rack 15 from the pin 29. Thus, the user will know that the limit of the operating range has been reached but will nevertheless be able to go beyond that range by overcoming the force of the indexing spring. At the opposite or closeup end of the range, further clockwise rotation of knob 5 is prevented by a fixed stop or by the engagement of pin 29 with the left-hand end of slot 27.

Figures 1, 2:
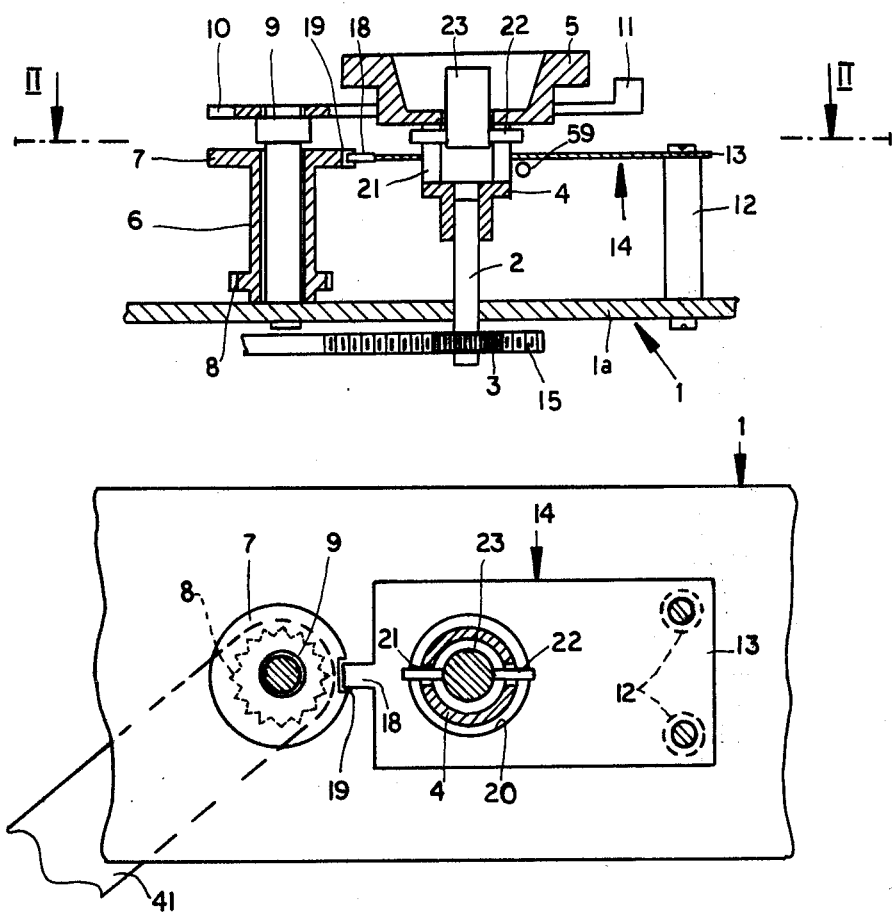
FIG. 1 is a fragmentary cross-sectional view of a housing of a bellows camera provided with a focusing and shutter-control mechanism embodying my invention.
FIG. 2 is a sectional plan view taken on the line II—II of FIG. 1.

As further illustrated in FIGS. 1-3, a pushbutton 23 is axially seated within knob 5 to serve as a trigger for the release of the shutter after the same has been cocked with the aid of a wind-up lever 11 which is freely rotatable on post 9 and is linked with the gear train of knee joint 40 via a lost-motion coupling connecting it with a disk 7 on post 9, that coupling including a pin 54 on the disk engaging in a semicircular slot 55 on a hub portion of lever 11. Disk 7 is integral with a sleeve 6 which constitutes the input shaft of the gear train and is rigid with a gear 8 constituting the first member of that train, being received in the hollow leg 41 of knee joint 40 (omitted in FIG. 1) as more fully described in my application Ser. No. 831,279.

Knob 5 has a hollow stem 4 fastened to the upper end of shaft 2, this stem forming a seat for pushbutton 23 which is vertically movable along the stem axis. Pushbutton 23 has a pair of radially extending, diametrically opposite lugs 22 passing outwardly through two lateral slits 21 so as to overlie a leaf spring 14 which has an aperture 20 traversed by stem 4. Leaf spring 14 has an end 13 fixedly supported on the internal housing wall 1a by a pair of posts 12 and has its opposite end formed with a tongue 18 designed to engage in a peripheral notch 19 of disk 7 when its pin 54 occupies the position shown.

Figure 4:
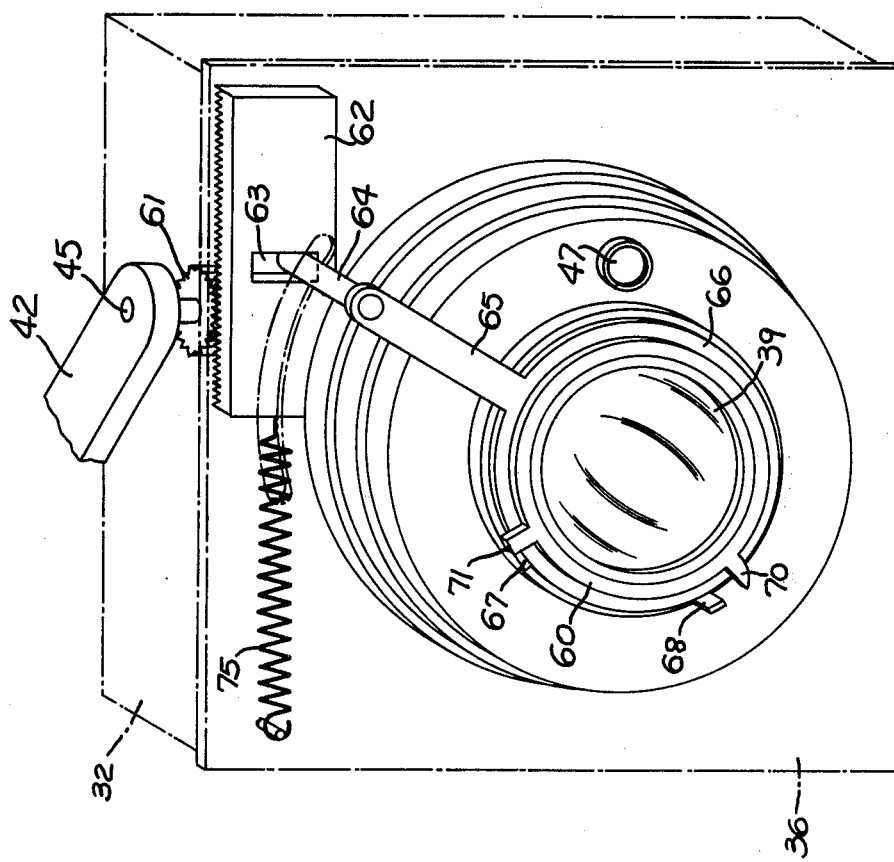
FIG. 4 is a diagrammatic perspective view of the front end of the camera.

The shutter mechanism illustrated in FIG. 4 comprises a setting ring 66 centered on axis O which is coupled with the shutter proper, designated 60, in the conventional manner and is rotatable in a clockwise direction into its illustrated cocked position against the force of a biasing spring 75 tending to restore it to a normal position. Spring 75 is anchored to the lens board 36 and to a lug 65 of ring 66 which also carries a pin 64 engaging in a notch 63 of a rack member 62 meshing with a pinion 61. Ring 66 further carries a pair of lugs 67 and 68, lug 67 coacting with a dog 71 of shutter 60 to wind it up during clockwise rotation whereas lug 68 is engageable with a tooth 70 on the return stroke to open the shutter blades for the selected exposure time.

Pinion 61, keyed to output shaft 45, is rigid with the last gear of the train housed in legs 41, 42 of knee joint 40. When the wind-up lever 11 (FIG. 3) is rotated counterclockwise against the force of a biasing spring (not shown) to move the pin 54 into its illustrative position from its normal position at the opposite end of slot 55, the mechanism including disk 7, sleeve 6, gear 8, pinion 61 and rack 62 positively transmits this rotation to setting ring 66 which is maintained in its cocked position as the tongue 18 of FIGS. 1-3 snaps into the notch 19.

To release the shutter from this cocked position, the user depresses the pushbutton 23 so that the lugs 22 decouple the leaf spring 14 from the driving disk 7 whereupon spring 75 (FIG. 4) causes ring 66, pinion 61, gear 8 and disk 7 to rotate in the reverse direction as the shutter is tripped by the coaction of lug 68 with tooth 70.

In the collapsed position of the camera, a finger 59 on lens mount 32 comes to lie under the leaf spring 14 to prevent any untimely depression thereof if the shutter happens to be cocked. It will be understood that spring 14 is sufficiently stiff to remain substantially level in the region of its fixed end 13 even when its tongue 18 is trapped beneath disk 7 so that finger 9 can move in under it regardless of the position of the shutter-control mechanism.

Whenever the user wants to resume the taking of pictures after the camera has been collapsed, a clockwise rotation of knob 5 from the position of FIG. 3 to or past the indexed "infinity" position will release the latch 48 so that the lens mount 32 is re-extended, manually or by spring force, with pin 29 snapping back into engagement with rack 15 by momentarily camming aside the prong 32 before coming to rest against prong 31.

Naturally, the gear 8 need not itself be the first member of the gear train received in legs 41, 42 of knee joint 40 but may be in driving engagement with that member.

The system according to my present invention allows the taking of pictures with one hand only, the user focusing the camera by turning the knob 5 between the thumb and the middle finger of that hand and then depressing the trigger 23 with the index finger.

I claim:

1. In a camera provided with a housing adapted to receive a photographic film to be exposed, lens means axially movable with reference to the film plane, a focusing knob on said housing operatively coupled with said lens means for axially moving same, a shutter in line with said lens means spring-biased into a normal position and displaceable into a cocked position, and an actuating mechanism on said housing for operating said shutter, the improvement wherein said actuating mechanism comprises:

wind-up means including a rotatable disk alongside said knob operatively coupled with said shutter for displacing same into its cocked position;

a retaining member having a coupling formation engageable with a mating formation of said disk for holding said shutter in said cocked position; and trigger means including a pushbutton coaxially received in said knob for deactivating said detent means to release said shutter, said pushbutton having an extension engageable with said retaining member for depressing same.

2. The improvement defined in claim 1 wherein said wind-up means further comprises an operating lever connected with said disk via a lost-motion coupling.

3. The improvement defined in claim 1 wherein said retaining member is a leaf spring generally coplanar with said disk and provided with an aperture, said knob having a hollow stem traversing said aperture and forming a seat for said pushbutton, said extension passing substantially axially through a lateral slit in said stem.

4. The improvement defined in claim 3 wherein said lens means is carried by a lens mount movable relatively to said housing for focusing purposes, further comprising a linkage connecting said lens mount with said housing and transmission means operatively coupling said knob with said linkage, said transmission means including a shaft rigid with said stem, a pinion on said shaft and a rack member in mesh with said pinion.

5. The improvement defined in claim 4 wherein said lens mount is receivable in said housing in a collapsed position, further comprising stop means on said lens mount juxtaposable with said leaf spring for preventing a depression thereof in said collapsed position.

6. The improvement defined in claim 3 wherein said coupling formation is a tongue integral with said leaf spring, said mating formation being a notch in the periphery of said disk.

7. The improvement defined in claim 1 wherein said wind-up means further comprises a gear train drivingly coupled with said disk.

* * * * *